Feb. 3, 1970  P. M. KOBREHEL  3,493,295
MEMORY MIRROR
Filed March 8, 1967
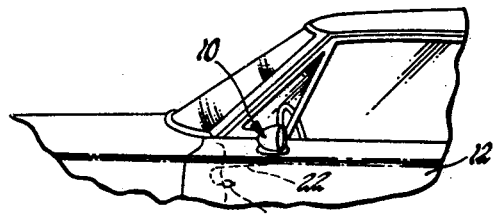
Fig. 1
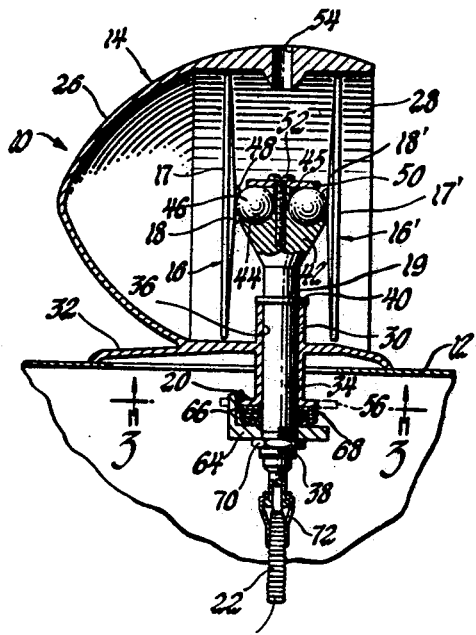
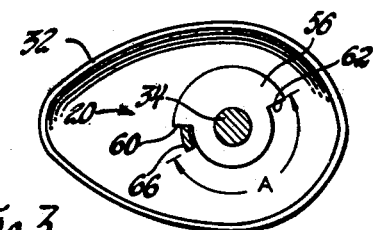
Fig. 2
Fig. 3
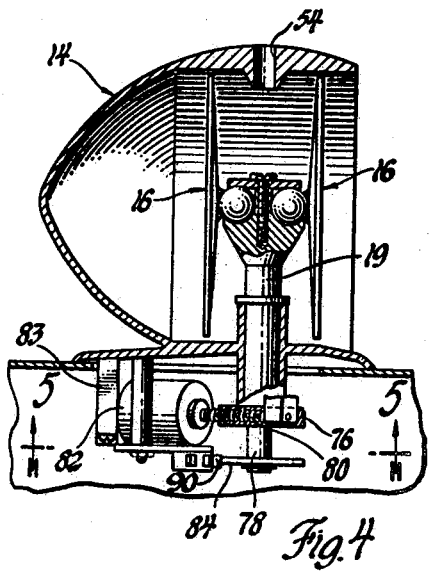
Fig. 4
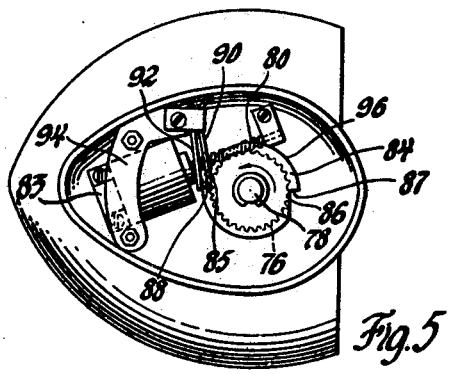
Fig. 5
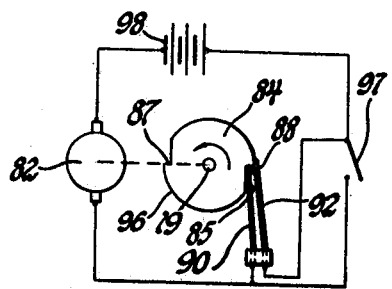
Fig. 6
INVENTOR.
Peter M. Kobrehel
BY
E. J. Biskup
ATTORNEY

United States Patent Office 3,493,295
Patented Feb. 3, 1970

3,493,295
MEMORY MIRROR
Peter M. Kobrehel, Warren, Mich., assignor to General Motors Corporation, Detroit, Mich., a corporation of Delaware
Filed Mar. 8, 1967, Ser. No. 621,622
Int. Cl. G02f 2/00
U.S. Cl. 350—300                    6 Claims

ABSTRACT OF THE DISCLOSURE

A vehicle rear view mirror assembly characterized by having a rotatable shaft to which a pair of independently adjustable mirrors are pivotally connected. From a position interior of the vehicle, the shaft can be selectively rotated between two predetermined positions to present one or the other of the mirrors for viewing.

---

While conventional remotely controlled rear view mirrors permit universal adjustment of the mirror position from the interior of a vehicle, the selection of the optimum viewing position is oftentimes a tedious process and must be repeated for each change of drivers. In most instances, universal remote movement is not required inasmuch as only a limited number of people drive a particular vehicle and therefore only a limited number of mirror positions are actually needed.

The mirror assembly made in accordance with the present invention utilizes a pair of identical independently adjustable mirrors rotatable between two viewing positions by a control knob located in the interior of the vehicle. The mirror is ideally suited for situations where two people, such as husband and wife, share the use of an automobile. Initially, each party sets the control knob at his respective setting and manually adjusts the mirror position for the optimum viewing angle. Thereafter, by moving the control knob to his setting, the mirror is quickly and conveniently returned to its original position.

Accordingly, the objects of the present invention are; to provide a remotely controlled mirror assembly having repeatable preset positions; to provide a mirror assembly wherein either of two independently adjustable mirrors may be readily and easily presented for viewing by simple rotation of a remotely located control knob whereafter the position of each mirror is held accurately and securely; and to provide a rear view mirror wherein each of two drivers may position one of two independently adjustable mirrors for optimum viewing and thereafter repeatedly return the mirror to the chosen position quickly and conveniently.

These and other objects will become apparent to one skilled in the art upon reading the following detailed description, reference being made to the accompanying drawings in which:

FIGURE 1 shows the mirror assembly made in accordance with this invention mounted on a vehicle.

FIGURE 2 is a side cross-sectional view of the mirror assembly.

FIGURE 3 is a view taken along line 3—3 of FIGURE 2.

FIGURE 4 is a side cross-sectional view of a modification of the mirror shown in FIGURE 2.

FIGURE 5 is a view taken along line 5—5 of FIGURE 4.

FIGURE 6 is a schematic of the control circuit for the mirror shown in FIGURE 5.

Referring to FIGURE 1, a mirror unit 10 is mounted on a vehicle door 12 and, as shown in FIGURE 2, generally comprises a housing 14, a pair of identical mirror elements 16 and 16' having conventional reflecting surfaces 17 and 17' and supporting structure 18 and 18', a rotatatable shaft 19, a stop assembly 20, a flexible control cable 22, and a remotely located control knob 24.

The housing 14 comprises a mirror housing shell 26 having a mirror receiving cavity 28 formed therein, a bearing sleeve 30, and a base 32 provided with appropriately disposed openings for the reception of securing screws or bolts for mounting the housing 14 upon a suitable support.

The shell 26 may take various shapes and forms, however, the design goal should be to achieve an aerodynamic contour which will minimize the wind resistance of the mirror assembly while, at the same time, providing an aesthetically appealing configuration. The mirror receiving cavity 28 should be of such size to enclose the mirror elements 16 and 16' thereby isolating the structure from position disrupting air currents. The present invention uses circular reflective surfaces 17 and 17' and, in accordance with the above criteria, a cylindrical mirror receiving cavity.

The shaft 19 includes a bearing portion 34 inserted into a bore 36 formed in the bearing sleeve 30 and has a threaded end 38, a retaining shoulder 40, and a mirror support section 42 having sockets 44 formed in its end face 45 in diametrically opposing relationship. The axes of the shaft 19 and the bearing sleeve 30 extend radially inward of the axis of the mirror cavity 28. Spherical balls 46 attached by welds 48 to the mirror elements 16 and 16' are received in the sockets 44 and are frictionally secured in place by a washer 50 and screw 52. An appropriate tool may be inserted through an opening 54 formed in the housing 14 to vary the pressure on the ball and socket connection in assembly. It should be apparent that the separate ball and socket connections permit each mirror to be independently adjusted for viewing.

As seen in FIGURES 2 and 3, a circular flange 56 formed on the lower end of bearing sleeve 30 has an arcuate portion removed to form radially outward extending stop surfaces 60 and 62. A stop sleeve 64 is pressed over the threaded end 38 of the shaft 19 and has an upwardly extending tang 66 which cooperates with stop surfaces 60 and 62 to limit the rotation of the shaft 19 to a predetermined angle A which, in the preferred embodiment, is selected to be 180°.

Interposed between the flange 56 and the stop sleeve 64 is a friction unit 68 of any suitable design such as friction pads and a Belleville spring. The stop sleeve 64 and the friction unit 68 are secured axially to the threaded end 38 of the shaft by a nut 70. By adjusting the nut 70 so as to decrease the distance between the shoulder 40 and the stop sleeve 64, sufficient friction can be applied by the friction unit 68 to the flange 56 to prevent inadvertent rotation of the shaft 19.

One end of the flexible control cable 22 is connected to the shaft 19 by any suitable means such as a crimped connector 72. The other end is attached to the control knob 24 mounted interior of the vehicle on the door trim pad 74. Rotation of the control knob 24 will cause the shaft 19 and associated mirror elements 16 and 16' to rotate within the limits permitted by the flange 56 and the stop sleeve 64. The control knob 24 may be suitably inscribed to show the remote position of the mirror elements. Although a flexible cable and a rotatable actuator have been used in this embodiment, other mechanical combinations such as a push-pull bar or cable and lever, a rack and pinion, or friction wheels could be used to remotely rotate the shaft 19 within the previously described limits.

In operation, each party, at his respective predetermined control knob setting, manually adjusts the mirror thus presented to a position best suited for his driving requirements. Thereafter, by setting the control knob 24 at the chosen position, the party can easily and conveniently return his mirror to its original viewing position.

In the modification shown in FIGURES 4 through 6, the rotation of the shaft 19 is accomplished by an electrically driven worm gear and wheel arrangement. More specifically, a worm wheel 76 secured to the reduced section 78 of shaft 19 meshes with an axially extending worm gear section 80 of a conventional unidirectional direct current electrical motor 82. A control cam 84 is attached to the reduced shaft section 78 and, as will be explained below, serves to regulate the operation of the motor 82. Notches 85 and 86 formed in the control cam 84 define radially outward extending stop surfaces 87 and 88. As in the manually operated mirror assembly, the enclosed angle between the stop surfaces 87 and 88 is selected to be 180°.

A pair of electrical contacts 90 and 92, biased inwardly towards shaft 19, are mounted on an arm 94 which in turn is attached to the motor mounting block 83. The contacts 90 and 92 are shown in the open position in FIGURE 5 with contact 90 resting in notch 85 and the end of contact 92 held separated therefrom by the projection of stop surface 88. It should be apparent that initial counterclockwise rotation of the shaft 19 will allow contact 92 to clear the projection and snap into engagement with contact 90. As the control cam 84 continues to rotate, the contacts will be held together by riding on the outer circular surface 96 of the control cam 84 and will be held in this position until contact 90 snaps into notch 86 thereby breaking the connection.

FIGURE 6 shows the control circuit for the aforementioned arrangement. A switch 97 mounted interior of the vehicle is interposed between direct current power supply 98 and the motor 82. The contacts 90 and 92 are placed in a parallel circuit between the switch 97 and the motor 82 so that when the switch 97 is closed, the circuit will be activated to drive the motor 82. Once the contacts 90 and 92 have come into engagement, the switch 97 can be released and the motor will continue to drive the shaft 19 until contact 90 snaps into notch 86 as previously mentioned. As should be apparent, other electrically driven arrangements could be used to achieve the above result such as a unidirectional motor with a detent cam or a bidirectional motor in combination with the previously discussed stop assembly 20.

While in the modifications discussed above, the mirror assembly is mounted on the vehicle door and the controls mounted on the door trim pad, it should be clear that the same could be successfully mounted on the vehicle fender and dashboard respectively and that such mounting as well as other charges and modifications are only a choice of design rather than a departure from the intended function.

We claim:

1. A remotely controlled mirror assembly for a motor vehicle to accommodate drivers with differing viewing angle preferences, said mirror assembly comprising: a support member having a mirror receiving cavity formed therein and a base adapted to be attached to the vehicle with said cavity being within the forward lateral vision of said drivers; a shaft rotatably supported by said support member and having a first end extending into said cavity and a second end extending outwardly of said base; stop means operatively associated with and establishing two predetermined angular positions for said shaft; actuator means controlled interior of said vehicle for selectively rotating said shaft between said predetermined angular positions; a pair of identical mirror elements circumferentially spaced about and universally supported at diametrically opposed ball and socket connections by said first end for concurrent rotation therewith between said predetermined angular positions, one of said mirrors elements being adjustable by one of said drivers to provide the latter with optimum rear viewing at one of said predetermined angular positions, the other of said mirror elements being adjustable by the other of said drivers to provide the latter with optimum rear viewing at the other of said predetermined angular positions whereby said drivers can alternately select a rearward field of vision best suited for their individual driving requirements.

2. The invention as recited in claim 1 wherein said actuator means comprises a flexible cable having one end connected to said shaft and the other end connected to a remotely controlled actuator the movement of which causes rotation of said shaft, and said stop means including cooperating stop members connected to said base and said shaft for locating said mirror elements in said predetermined positions.

3. The invention as recited in claim 2 wherein the cooperating stop members comprise a first stop member attached to said base and having a pair of circumferentially spaced radially extending surfaces, a second stop member attached to said shaft and having a second pair of circumferentially spaced radially extending surfaces, one surface of said first stop member engageable with one surface of said second stop member at each of said predetermined positions whereby rotation of said shaft is limited therebetween.

4. The invention as recited in claim 1 wherein said actuator means comprises a single unidirectional electric motor connected to said base, gear means drivingly connecting said motor and said shaft, means for energizing said motor, and means for automatically deenergizing said motor when said shaft is located in either of said predetermined positions.

5. The invention as recited in claim 4 wherein said gear means comprises a worm gear driven by said motor, a worm wheel secured to said shaft and meshing with said worm gear whereby energization of said motor causes rotation of said shaft.

6. The invention as recited in claim 4 wherein the means for automatically deenergizing said motor comprises a cam member having two notches formed therein, said notches defining radially outward extending stop surfaces having an enclosed angle equal to the predetermined rotation of said shaft, a pair of parallel contacts, one of said contacts adapted to be located in either of said notches, the other of said contacts located outwardly of said one of said contacts and said control cam, said contacts engaging each other at all angular positions except at said notches.

References Cited

UNITED STATES PATENTS

| 2,988,957 | 6/1961 | Kotora. | |
| 2,397,861 | 4/1946 | Hoover | 74—526 X |
| 2,871,761 | 2/1959 | Snyder | 350—289 |
| 2,883,634 | 4/1959 | Origoni et al. | 74—526 X |
| 1,114,225 | 10/1914 | Cahusac | 200—153.13 |
| 1,520,233 | 12/1924 | Gabriel | 74—526 |
| 1,925,631 | 9/1933 | Fotakis | 350—282 |
| 2,413,894 | 1/1947 | Sorensen | 350—303 |
| 2,758,508 | 8/1956 | Petri et al. | 350—289 |
| 2,877,686 | 3/1959 | Foster | 350—289 |
| 2,989,896 | 6/1961 | Bertell | 350—282 |

FOREIGN PATENTS 191,940  9/1957  Austria.

DAVID SCHONBERG, Primary Examiner

A. M. OSTRAGER, Assistant Examiner

U.S. Cl. X.R.

350—288, 289, 307